United States Patent [19]
Remke et al.

[11] 3,752,529
[45] Aug. 14, 1973

[54] BEVERAGE TRUCK

[75] Inventors: Theodore Karl Remke, Groose Pointe, Mich.; Russell V. Muller, Park Hills, Ky.

[73] Assignee: Remke Incorporated, Roseville, Mich.

[22] Filed: Feb. 26, 1971

[21] Appl. No.: 119,093

[52] U.S. Cl. ............................. 296/24 R, 160/201
[51] Int. Cl. ............................................. B60p 1/00
[58] Field of Search ...................... 296/24; 160/201

[56] References Cited
UNITED STATES PATENTS
3,135,544  6/1964  Mickey .......................... 296/24 R

*Primary Examiner*—Philip Goodman
*Attorney*—Robert H. Elliott

[57] ABSTRACT

This invention relates to a vehicular beverage truck body similar to those now in use, wherein the flexible doors for each of the several longitudinal compartments are of greater length than the body height and thus extend into the roof top during its closed usage, however when the doors are opened, they are guided by track members on opposite sides of each of the several independent compartments in such a manner as to be positioned in spaced generally parallel relationship to a vertically disposed central longitudinal wall which extends substantially throughout the full length of said body.

13 Claims, 5 Drawing Figures

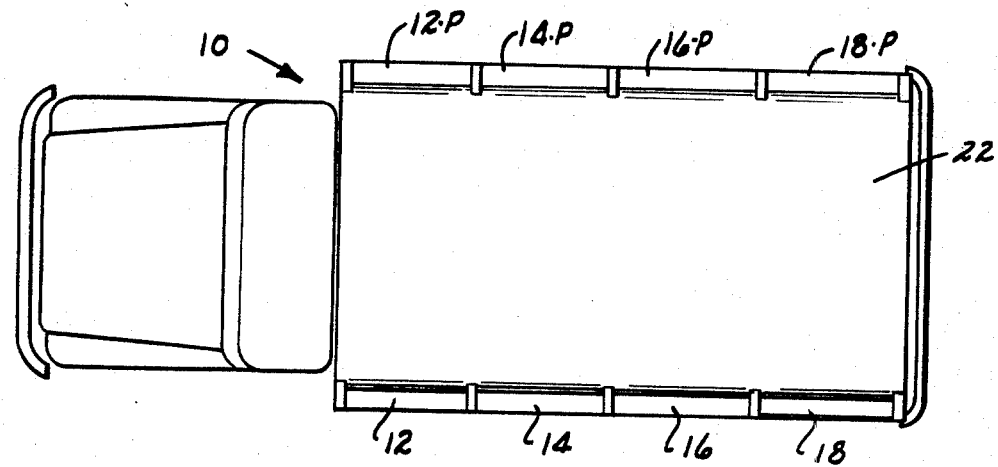
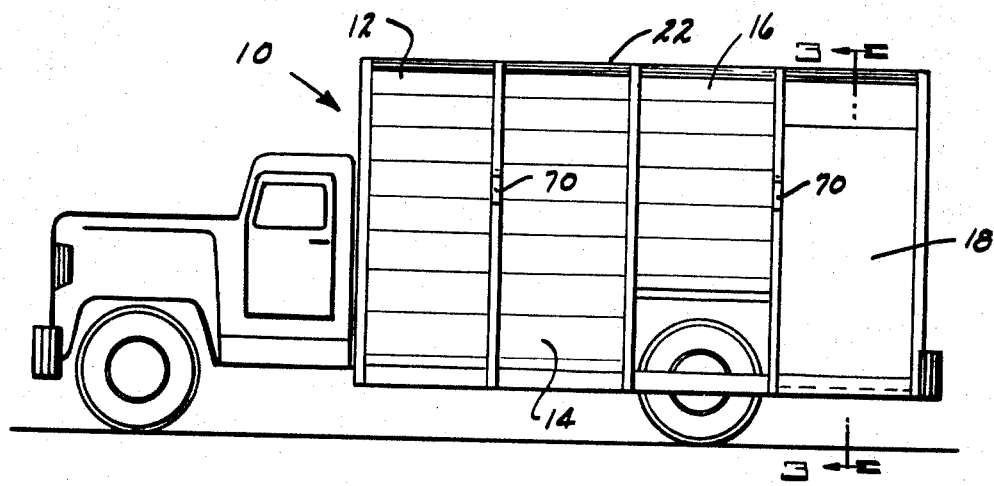

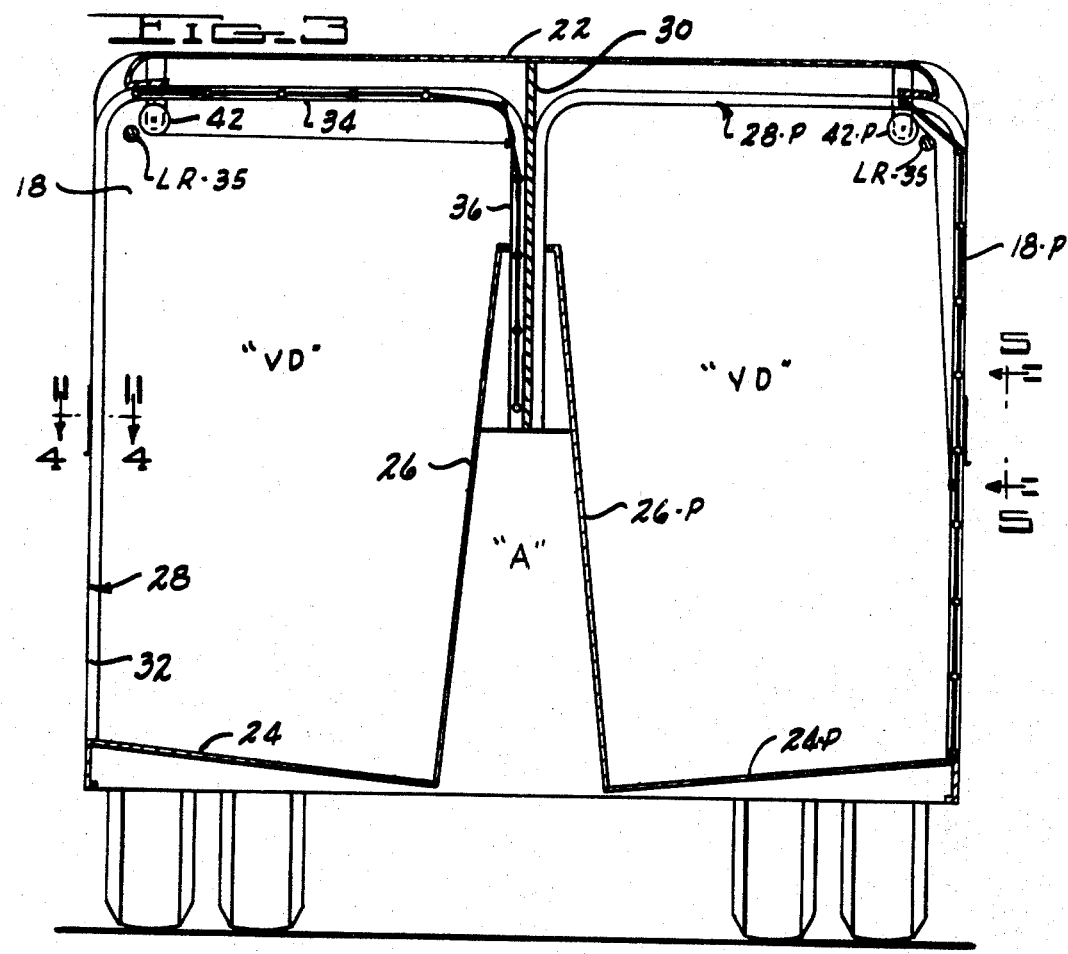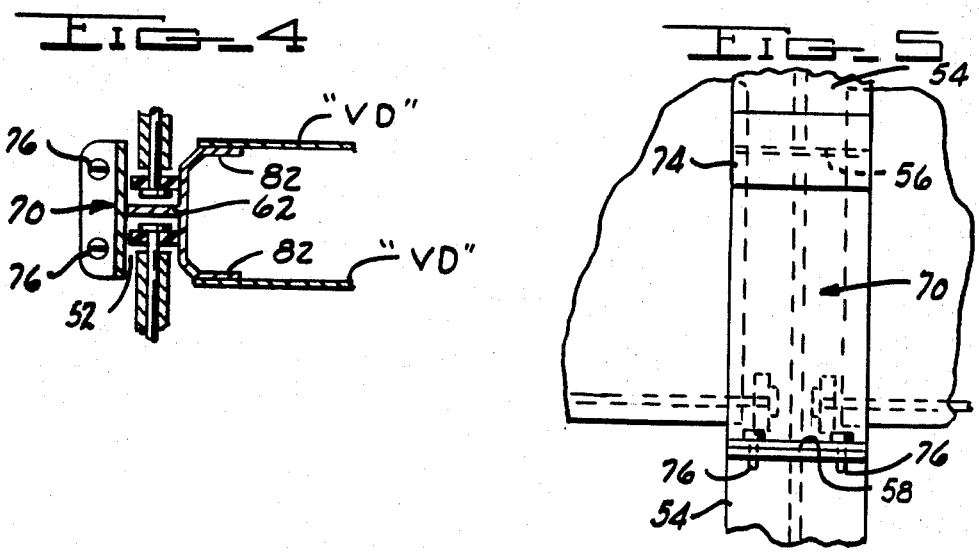

BEVERAGE TRUCK

FIELD OF SEARCH

The field of search for the above identified type structure is found in Class 160, Sub-class 191 and 201, and in Class 296, Sub-class 24.

BACKGROUND

While the use of an overhead flexible door in and of itself is not new, the use of a flexible door providing a closure for a totally independent compartment in a vehicular beverage truck body is unique when the flexible door is guided by track members into parallel spaced relationship to a central wall which extends longitudinally throughout the length of the said vehicular truck body so as to provide additional height within each of the respective independent compartments without increasing the overall height of the body.

The additional height referred to is obtained by the elimination of the over and under tracks provided in truck bodies of conventional construction, by the substitution of inverted "U" shaped track members which position the opened flexible doors on each of the respective compartments in parallel spaced relationship to the vertically positioned longitudinally disposed central wall which extends substantially throughout the full length of the body. This construction provides totally independent compartments through which no communication is possible with another compartment.

It is therefore a primary object of the present invention to provide a vehicular body construction which is simple, durable and relatively inexpensive in structure, while being compact and readily serviced in a minimum of time and expense.

Another object of the invention is the provision of a vehicular body having a flat roof which incorporates the use of flexible sliding doors, wherein the useable space therein is increased in height without increasing the height of the vehicle.

Still another object of the instant invention is the provision of a vehicular truck body wherein the vertically disposed central wall effectively provides for totally independent compartmentation of the vehicle on each respective side thereof.

The above and other objects of the present invention can be accomplished by the provision of vehicular truck body construction having a generally rectangular base portion, a vertically disposed central wall extending longitudinally throughout substantially the full length of said rectangular base portion, a plurality of vertical walls on opposite sides of said central wall disposed at right angles thereto and in generally parallel spaced relationship to each other, a substantially rectangular roof top positioned directly above said rectangular base portion and supported by said vertical walls and said vertically disposed central longitudinal wall, said base, roof top and all of said vertical walls forming a plurality of totally independent compartments each of which has a single access opening therein, each of said independent compartments having a pair of inverted "U" shaped track members secured to the opposed vertical walls of each of said independent compartments, a counterbalanced flexible sliding door mounted in each of the respective track members to form a closure for each of the access openings, displacement of said flexible sliding door in said tracks operating to open the closed compartment, with said flexible door thereafter being positioned in pre-determined spaced relationship to the central longitudinal wall, while the floor of each respective independent compartment is disposed at an angle and the utilitarian area of each respective compartment is defined by a wall disposed at right angles to said floor and in angular spaced relationship to said central vertical wall.

Other objects of this invention will appear in the following description and appended claims, reference being had to the accompanying drawings wherein like reference characters designate corresponding parts in the several views.

IN THE DRAWINGS

FIG. 1 of the drawings illustrates an elevational view of a beverage truck body which incorporates the present invention.

FIG. 2 shows a top plan of the vehicle illustrated in FIG. 1 of the drawings.

FIG. 3 is a cross sectional view of one of the independent compartmented sections of the vehicular body taken substantially along lines 3—3 of FIG. 1.

FIG. 4 is a sectional view through the door insertion track portion opening and taken substantially along lines 4—4 of FIG. 3.

FIG. 5 is an elevational view taken in the direction of the arrows 5—5 of FIG. 3 showing the cover of the door insertion track portion opening.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Looking now at the drawings, it will be noted that FIG. 1 represents an elevational view of a beverage truck body which incorporates the present invention, wherein eash of the four independent compartments on each side of the body have door members 12, 14, 16 and 18 installed in track members provided along each vertical edge of each of the openings.

FIG. 2 of the drawings illustrates a top plan of of the beverage truck body 10, shown in FIG. 1, and is particularly illustrative of the clean lines and simplicity of design which has been incorporated into the present invention.

FIG. 3 of the drawings shows a cross section of the beverage truck body 10, which is illustrated in FIG. 1, with the section being taken along lines 3—3 thereof. Door 18 is shown in the track portion, in the open position in both FIGS. 1 and 3 respectively, while door 18–P is shown in the closed position. It will be noted that the body compartment is of generally symmetrical configuration, with the roof portion 22 being generally flat and horizontal, while the floor portions 24 and 24–P are lower in the center sections than at the outer edges thereof. The central longitudinally disposed wall 30 is vertically positioned and intersects the flat roof portion 22 at right angles, and the upper portion of the centrally positioned "A" frame in the same manner. The upstanding rear walls 26 and 26–P are disposed at generally right angles to the floor portions 24 and 24–P. Inverted "U" shaped door track members 28 and 28–P extend vertically upward along the outer edge 32 of the body 10, generally horizontally along and in spaced relationship to the roof 22 and then downwardly in generally parallel relationship with the central vertical wall 30, terminating at the top of the "A" frame. This is also true for opening 18–P also, so that for all intents and purposes, each of the sides is symmetrical, but of opposite hand.

A longitudinally disposed rod is disposed along the full length of each side of the body, which structure is best illustrated in United States Patent Application Ser. No. 753,270, filed Aug. 16, 1968, titled, Lock Construction.

In spaced relationship to the lock bar 35, a door counterbalance (spring wound) 42 is suspended from the roof portion 22. Each door 12, 12–P, 14, 14–P, 16, 19–P, 18 and 18–P has a counterbalance 42 attached thereto, by means of a braided wire 44 wound around the cylindrical outer portion of the counterbalance 42 and attached to the door panel in a suitable location. It will be understood that the counterbalance in this instance is double acting, since it winds up when the door is in the open position, as well as in the closed position, the least load being applied to the door structure is when the door is in the half opened position, although the spring can be wound so as to provide the maximum efficiency of the door for ease of opening and closing the respective doors.

FIG. 4 illustrates the door insertion opening 52, one opening being provided between each pair of doors. The opening represents the removal of a portion of the outer flange 54 of the back to back "U" shaped cross sectional door track for a short distance, wherein the flange terminates at 56 and resumes at 58 in FIG. 5, while the central portion of the flange 62 remains untouched. The cover 70, merely represents a replacement of that flange with a separate piece of the same configuration as the portion which had been removed. So that the cover 70 can be rigidly positioned, a strap 74 is attached to the upper portion of the flanged track, so that the cover 70 can be inserted therebeneath, as shown in FIG. 5, while the lower portion of the cover, as well as the "U" shaped track portion is fitted with a horizontal flange, each flange having two openings therein for receiving a threaded screws 76 or their equivalent, for maintaining said cover 70 in proper position. It will therefore be readily apparent that when the flange on the track is removed for a short distance that the door track wheels can be inserted therethrough without any problem and when the cover 70 is properly positioned over the removed section, the doors will be properly secured and positioned without the possibility of indescriminate or accidental removal of the door proper.

The inner portion 82 of the flanged track has secured thereto the vertical dividers for each of the respective compartmented sections formed between each of the door openings.

Having thus described our invention, we claim:

1. In a vehicular truck body construction, the combination of,
   a generally rectangular base portion;
   a vertically disposed central wall extending longitudinally throughout substantially the full length of said rectangular base portion;
   a plurality of vertical walls on opposite sides of said central wall disposed at right angles thereto and in generally parallel spaced relationship to each other;
   a generally flat rectangular roof top positioned directly above said rectangular base portion;
   said base, roof top and vertical walls forming a plurality of independent compartments each having an open side;
   each of said independent compartments having a pair of track members secured to the opposed vertical walls thereof;
   a flexible door slidably mounted in each respective pair of track members to form a closure for each respective open side;
   a torsional spring wound counterbalance for each door, said counterbalance being disposed adjacent the intersection of the roof line with the compartment opening, and in generally parallel relationship with the said roof line;
   displacement of said flexible door in said tracks operating to open the closed compartment, with said flexible door thereafter being positioned in predetermined spaced relationship to the central longitudinal wall.

2. A structure as in claim 1, wherein each of said track members is of inverted "U" shape the legs thereof of different lengths, with the central portion intermediate the ends thereof being located in spaced relationship to the roof top.

3. A structure as in claim 1, wherein said roof top is of less width than the rectangular base portion and the central wall in each of the respective compartments are disposed in angular relationship to the roof top.

4. A structure as in claim 1, wherein the longitudinal edges of said generally flat roof top are notched and turned under itself to form a weather seal, for the flexible door.

5. A structure as in claim 1, wherein each of the vertical walls and the central wall form the support members for the roof top.

6. A structure as in claim 4, wherein the open area of each respective independent compartment extends into the generally flat roof and accomodates a flexible door of greater length than the overall height of each of the said respective compartments.

7. A structure as in claim 1, wherein the floor of each respective compartment is disposed at an angle, while the utilitarian area of said compartment is defined by a wall disposed at substantially right angles to said floor and in complementary angular spaced relationship to said central vertical wall which separates each of the said compartments.

8. A structure as in claim 1, wherein said torsional spring counterbalances are disposed in substantially parallel spaced relationship to said central vertical wall and said generally flat roof top, intermediate said track members.

9. A structure as in claim 1, wherein said generally flat roof is of substantially identical size to the rectangular base portion and the sides of said vehicular body are disposed in generally parallel relationship to each other and the central dividing wall.

10. A structure as in claim 1, wherein a section of the door track flange is removed from a pre-determined location and replaced with a cover, for ease of door installation, one portion being removed between at least each of two door assemblies.

11. A structure as in claim 1, wherein a generally vertical section of the door track flange is removed for a predetermined distance, the edges of the cut out portions are generally parallel to each other and disposed at right angles to the outer vertical edges of the door track, the upper edge of the said door track has a squared vertical flange secured to the outside vertical surface of the door track, which flange depends downwardly below the edge of the cut out portion, while the lower edge of the cut out portion has a horizontal flange extending therefrom, the cover which is inserted therebetween is of the same configuration and dimension as the vertical flange portion removed, the upper edge of the cover being squared off and positioned under the downwardly depending squared vertical flange and in generally parallel relationship to the upper edge of the cut out portion, while the lower edge of the cover has a horizontal flange secured thereto which is positioned in generally parallel relationship the fixed flange on the lower edge of the cut out portion, both of the horizontal flanges are secured in predetermined relationship so as to maintain the dimensional relationship of the door track.

12. A structure as in claim 11, wherein each of the horizontal flanges has a pair of aligned openings therein, through which are inserted the positioning means.

13. A structure as in claim 11, wherein at least one cut out portion and cover are provided between each of two door assemblies, so as to facilitate the quick and easy installation of a door assembly.

* * * * *